United States Patent [19]
Brewer

[11] Patent Number: 5,454,952
[45] Date of Patent: Oct. 3, 1995

[54] METHOD AND APPARATUS FOR FRACTIONATION OF SUGAR CONTAINING SOLUTION

[75] Inventor: Graeme S. Brewer, Bundaberg, Australia

[73] Assignee: Applied Membrand Systems Pty Ltd., Queensland, Australia

[21] Appl. No.: 59,240

[22] Filed: May 7, 1993

[51] Int. Cl.$^6$ .................................................. B01D 61/00
[52] U.S. Cl. .................. 210/651; 210/641; 210/652; 210/650; 210/257.2; 210/195.2; 210/638
[58] Field of Search ................................ 210/650, 651, 210/652, 641, 195.2, 257.2, 638

[56] References Cited

U.S. PATENT DOCUMENTS

| | | |
|---|---|---|
| 3,799,806 | 3/1974 | Madsen . |
| 4,115,147 | 9/1978 | Shimizu et al. ........................ 127/54 |
| 4,563,337 | 1/1986 | Kim ...................................... 210/644 |
| 4,717,425 | 1/1988 | Lefebvre .......................... 210/321.79 |
| 4,861,486 | 8/1989 | Lefebvre ............................. 210/644 |
| 4,880,545 | 11/1989 | Swamikannu ....................... 210/654 |
| 4,944,882 | 7/1990 | Ray et al. ............................ 210/652 |
| 4,957,564 | 9/1990 | Garabbi . |
| 4,959,237 | 9/1990 | Walker ................................ 210/652 |
| 4,997,676 | 3/1991 | Lefebvre ............................. 427/245 |
| 5,250,182 | 10/1993 | Bento et al. ........................ 210/641 |

FOREIGN PATENT DOCUMENTS 41473  4/1972  Australia .

0126512  5/1984  European Pat. Off. .

OTHER PUBLICATIONS

Chemical Abstracts, vol. 112, p. 76 (Swamikannu A. X.), 1990.

*Primary Examiner*—Robert A. Dawson
*Assistant Examiner*—Ana M. Fortuna
*Attorney, Agent, or Firm*—John E. Reilly

[57] ABSTRACT

A method of removing ash from sugar containing solutions comprises contacting the sugar containing solution against one side of an ultrafiltration membrane with a stripping fluid to strip away monovalent ions and low molecular weight sugars which pass through the membrane. The stripping fluid is contacted at high pressure against one side of a nanofiltration membrane which allows passage of monovalent ions and water only. The deashed retentate can be returned to sugar containing solution, pass through an ion exchange column or cause to contact one side of a high pressure ultrafiltration membrane which allows passage of water monovalent ions and low molecular weight sugars. The permeate from the high pressure ultrafiltration membrane can be subjected to ion exchange to provide a liquid sugar having a low ash content while the retentate can be evaporated to a sugar product. The use of the semipermeable membranes allows efficient deashing of sugar containing solutions (i.e. sugar cane or sugar beet solutions) which improves the recovery of crystalline sugar and a quality of the sugar from the solution.

12 Claims, 4 Drawing Sheets

METHOD AND APPARATUS FOR FRACTIONATION OF SUGAR CONTAINING SOLUTION

TECHNICAL FIELD

This invention relates to a method for fractionating and at least partially removing inorganic ions from a sugar containing solution and particularly relates to a method for fractionating and at least partially removing ash from concentrated sugar cane or sugar beet juice.

BACKGROUND OF INVENTION

Sugar is recovered from sugar cane or sugar beet by a well known process involving extraction of sugar juice from the crushed sugar cane (or beet) plant followed by concentration and crystallization of the sugar from the sugar Juice. The extraction process utilizes water as the extracting fluid and thus will extract sugar together with any other water soluble impurities. In sugar cane (or beet) plants, these impurities include reducing sugars, and organic non-sugar molecules such as macromolecules and ash. The ash content includes minerals such as monovalent ions e.g. potassium, sodium and chloride or divalent ions such as magnesium and calcium. The monovalent ions are particularly troublesome in the production of sugar from sugar cane (or beet) as they inhibit the rate of crystallization of the sugar from the concentrated juice. These monovalent ions are known to inhibit crystallization by increasing the solubility of the sugar in the sugar juice and/or increasing the viscosity of the sugar juice. These ions are referred to as melassigenic (molasses-forming) ions.

In sugar factories, sugar is crystallised from a concentrated sugar juice in three separate crystallization stages each stage resulting in the production of a crystallized sugar fraction (called the A sugar, B sugar and C sugar respectively) and a non-crystalline fraction or molasses fraction called A molasses, B molasses and C molasses.

The A molasses which is the non-crystalline portion resulting from the first stage is fed into the second crystallization stage and further sugar crystallization occurs to form the B sugar. The non-crystalline portion of this stage (the B molasses) is fed into the third crystallization stage and further crystallization takes place to give a C sugar fraction and a C molasses. The C sugar fraction is relatively low quality and is used as seed crystals to facilitate crystallization in the first & second crystallization stages. The C molasses (also called final molasses) is not further refined and instead is used as a stockfeed or in the fermentation industry.

The effect of sugar crystallization in the first and second stages is that the resultant A and B molasses portions become progressively higher in the amount of impurities present including the amount of melassigenic ions. This results in reduction in the rate of crystallization in the third stage making crystallization difficult, energy intensive and expensive in terms of equipment, and only partially successful.

The resultant C molasses (or final molasses) is high in impurities and typically comprises over 50% ash, invert sugars and organic non-sugars in dry matter. The C molasses is currently used as an animal stockfeed or in the fermentation industry for the production of alcohol. However, the high impurity content and especially the high percentage of ions such as potassium results in a low value product.

Nevertheless, an average sugar mill plant produces approximately 30,000 tonnes of C molasses during a crushing season of which about 10,000 tonnes comprises sucrose. With the value of sucrose at $350.00 a ton, this translates to $3,500,000 of lost sugar valve. Therefore, the largest economic loss in a sugar mill is the amount of sugar lost in the C molasses.

Previously, attempts have been made to increase the recovery of sugar from C molasses and for the removal of impurities and especially the melassigenic ions from the molasses to promote crystallization of sugar.

Ion exchange has been used in the beet industry to remove ionic components or to replace them with alternative components. However, the use of ion exchange with cane sugar has problems with fouling of the resins by insoluble and colloidal materials. This has been observed even after the liming and clarification stages used in the production of sugar from cane sugar. Furthermore, the use of strong acid forms of the ion exchange resin causes appreciable inversion of sucrose and the use of strong base forms of ion exchange resin degrades the invert sugar into acids and colour compounds. Cane juice, with its relatively high invert sugar content would therefore be susceptible to the above difficulties. Furthermore, ion exchange resins are not selective only for melassigenic ions and will exchange calcium and magnesium ions which do not greatly influence the rate of crystallization of sugar from the sugar solution. Indeed, it has been found that salts which have a water of crystallization (such as magnesium sulphate or calcium chloride) can lower the sucrose solubility which is often a desirable effect in low-grade recovery and therefore their removal by ion exchange resins would not be advantageous.

Ion exclusion has been used whereby the cations in a sugar cane syrup are replaced by sodium via an acidic cation/exchange resin in the sodium form. The system works in a manner analogous to a chromatography column where separation of the ionic impurities from the non-ionic impurities is obtained and can be removed by elution of the column with water. Again, this system suffers from fouling due to the insoluble and colloidal materials present in cane sugar and is also time-consuming as it requires constant separation of the eluate into samples.

Nanofiltration comprises passing the sugar cane juice through a nanofiltration membrane having a hypothetical pore size of approximately 10 angstroms (1 nanometer). Nanofiltration membranes are thin film non-cellulosic membranes namely "nanofilters" to differentiate them from seawater Reverse Osmosis Membranes (often called hypofilters).

The nanofiltration membranes have low rejection of monovalent ions and reject organic compounds with molecular weight cut offs in the 200 to 500 MW range: Thus nanofiltration membranes are also differentiated from ultrafiltration membranes that typically reject organic materials with molecular weights greater than 10,000 MW.

The term nanofiltration is derived from the fact that these molecular weight cut off values correspond to hypothetical pores of about 10 angstroms i.e. one nanometer. Thus nanofiltration membranes are essentially impermeable to particulates and colloids.

Nanofiltration is a pressure driven process where the low monovalent ion rejection minimises the osmotic pressure difference accross the membrane.

Basically nanofiltration concentrates and part demineralizes dilute solutions of salts and sugars. The membrane flux (permeate flow through the membrane) decreases as the concentration of the feed stream increases.

Depending on solution composition and cost structure concentration of sugars past 20% solids is usually considered uneconomic (osmotic pressure too high).

Thus, at the concentration of 70° brix which is a typical concentration in the B molasses stream, nanofiltration will not function.

Electrodialysis has been suggested for partial demineralization of sugar syrups. However, considerable fouling of the dialysis membrane occurs and requires extensive preliminary pre-treatment of the sugar cane juice. Furthermore, the capital and running costs of electrodialysis treatments are high.

Organic solvents have been used to precipitate impurities which are soluble in water but largely insoluble in inorganic solvents such as alcohol. When added with the appropriate amount of water to molasses, the addition of alcohol can cause the precipitation of various impurities particularly the high molecular weight polysaccharides and the resulting molasses, when concentrated back to the original dissolved solids content, has a much lower viscosity. Some ash components are also removed by this process. However, the use of organic solvents requires considerable modification of a sugar cane plant and typically would require direct contact condensers, distillation columns and associated pipework and holding tanks.

SUMMARY OF THE INVENTION

It is an object of the invention to provide a method for at least partially removing inorganic ions from a sugar solution containing the ions which may alleviate the abovementioned disadvantages.

In one form, the invention comprises a method for fractionating and at least partially removing inorganic ions from a sugar-containing solution containing such ions, the method including the steps of (a) contacting said solution with one side of a first semi-permeable membrane having a pore size between 10–1000 angstroms, (b) contacting the other side of said semi-permeable membrane with a fluid which at least partially dissolves inorganic ions passing through said membrane, and (c) contacting the fluid from step (b) with one side of a second semi-permeable membrane allowing passage of water and monovalent ions but resisting passage of sugar molecules.

The method is suitable for removing ions from sugar solutions obtained from sugar cane.

The sugar-containing solution may be of any concentration or viscosity which allows it to contact the semi-permeable membrane. Although dilute solutions can be used, it is preferred that the solution is concentrated to increase the effectiveness of the method. Suitably, the sugar-containing solution has a brix value of between 20°–80° and more preferably between 50°–70°.

The inorganic ions may comprise ions present in the sugar cane and/or ions added to the sugar-containing solution. The inorganic ions may include melassigenic ions such as sodium, potassium and chloride. The inorganic ions may also include divalent ions such as calcium and magnesium.

The first semi-permeable membrane preferably comprises a pore size of between 50–250 angstroms and more preferably between 80–200 angstroms. The first semi-permeable membrane may be an ultra-filtration membrane.

Suitably, the sugar-containing solution contacts the first semi-permeable membrane under above atmospheric pressure to improve the efficiency of the method.

The first semi-permeable membrane suitably comprises between 40–80% available pore area and suitably has a thickness of between 30–100 microns.

The first semi-permeable membrane may be formed from plastics and suitably comprises synthetic polymers having chemical resistance such as to acids, alkali, chloride and peroxide and suitably has bacterial resistance and is operable at elevated temperatures.

The first semi-permeable membrane may comprise a hollow fibre or a spirally wound flat sheet. Suitably, a multiplicity of such hollow fibres or sheets are provided, arranged into a module having an inlet and an outlet. In this manner, compact hollow fibre modules can fit approximately 1.5 sq.m of membrane-area into modules 30 cm×6 cm. Spirally wound modules can fit about 5 sq.m of membrane area into a module of about 1.2 m×10 cm.

The modules may be connected in series or parallel or a combination of both with suitable conduit connecting the modules.

Suitably, the first semi-permeable membrane comprises an ultra-filtration membrane and may include a polypropylene membrane available from ENKA A.G., West Germany and marketed under the registered trade mark ACCUREL R; a polytetrafluoroethylene (PTFE) membrane available from W.L. Gore, U.S.A. and marketed under the registered trade mark GORE-TEX R membrane; and an acrylonitrile copolymer membrane available from RhonePolenc S.A., France.

The pore size of the first semi-permeable membrane fractionates the initial sugar containing solution to allow ions and sugars to pass through the membrane with macromolecules being retained in the initial sugar containing solution.

The fluid contacting the other side of the first semi-permeable membrane suitably comprises a stripping liquid to carry away ions and other material passing through the semi-permeable membrane by reduction of concentration polarisation on permeate side. Preferably, the stripping liquid comprises water either as a component of a stripping liquid mixture or as the sole component. The contact time of the fluid with the semi-permeable membrane may be varied depending on the rate of passage of the material across the semi-permeable membrane and the ability of the fluid to absorb and carry away the material. The fluid may be used at ambient, elevated or below ambient temperatures.

The method suitably comprises contacting the sugar-containing solution with a plurality of separate modules which may be connected in series, with the sugar-containing solution passing from one module into a second module.

The fluid contacting the other side of the semi-permeable membrane and containing any material which passed across the membrane such as ions, invert sugars and sugar is contacted with a second semi-permeable membrane. This fluid is typically of ultrafiltration quality and thus has a very low potential for fouling the membrane.

Preferably, the fluid is treated to at least partially remove the ions only and retaining the invert sugars and sugars.

The ions may be at least partially removed from the fluid by contacting the fluid at high pressure with one side of a semi-permeable membrane having a pore size allowing passage of water and ions such as sodium, potassium and chloride but resisting passage of sugar molecules. Suitably, the pore size is between 2–10 angstroms and a suitable membrane comprises a nanofiltration membrane.

The permeate passing through the second semi-permeable membrane and containing the dissolved ions may be evaporated to remove the ions. The evaporated fluid may be subsequently condensed and recycled for further use against the other side of the ultrafiltration membrane.

The partially deionized and concentrated fluid contacting the one side of the second semi-permeable membrane may be further deionized. Suitably, the partially deionized fluid is passed through an ion exchange resin or alternatively is contacted by diafiltration water.

The partially deionized fluid can be concentrated to a syrup containing sugars which may be used as a "painting" syrup, for use in the food additive industries or for use as a syrup for brewing or recrystallized.

The partially deionized sugar containing solution may be concentrated for use as a demineralized molasses product or may be further crystallized to recover sugar.

BRIEF DESCRIPTION OF THE DRAWINGS

The invention will be understood by reference to the following description of preferred embodiments thereof in which.

BEST MODE FOR CARRYING OUT THE INVENTION

Figure 1:
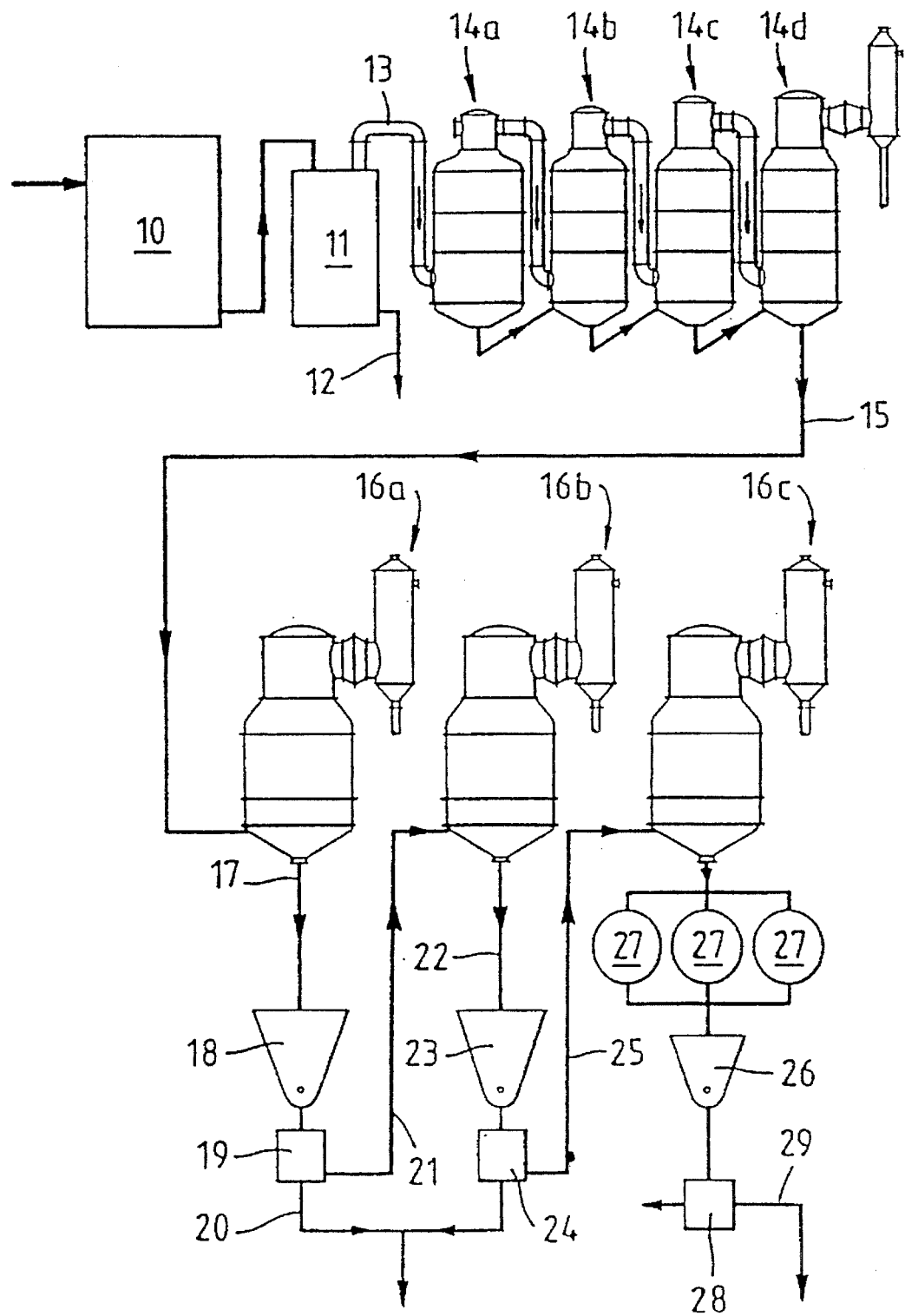
FIG. 1 is a flow diagram of a known sugar cane extraction plant.

Referring to FIG. 1 there is disclosed a flow diagram showing the basic components in the known process for extracting sugar from sugar cane.

In the process, sugar cane plants are initially shredded or chopped to a processible size and are passed into a milling plant 10 which mills the sugar cane plants and extracts the water-soluble components with a counter-current water flow. The mixed raw juice is passed into a clarifier 11. In the clarifier, the mixed raw juice is heated and milk of lime is added to neutralise the natural acidity of the juice and to form insoluble lime salts mostly calcium phosphate. By heating the limed juice to boiling or to slightly above, any albumin is coagulated and some of the fats, waxes and gums are also coagulated into precipitates. The scum or solid material is discarded through 12 and the clarified juice containing 12–16% solids is passed through 13 into the first of four evaporators 14a–d. The evaporators evaporate approximately two-thirds of the water contained in the clarified cane juice with each succeeding evaporator having a higher vacuum than the preceding one. The vapours from one evaporator can thus boil the juices in the second evaporator. The syrup passes from the fourth evaporator 14d through 15 and contains approximately 60% solids.

The condensed syrup is passed into the first of three crystallization stages 16a, 16b, 16c in the form of vacuum pans where the syrup is evaporated until saturated with sugar. In the first crystallization stage 16a, the mixture of formed crystals and syrup is discharged through 17 into a holding tank 18 whereafter it passes into centrifuge 19 which separates the sugar crystals (A sugar) from the molasses (A molasses). The A sugar is passed through 20 and it can be used as commercial sugar while the A molasses is passed through 21 into the second crystallization stage 16b where the crystallization process is repeated and the mixture of crystals and syrup is discharged through 22 into holding tank 23 and centrifuge 24 which separates the sugar crystals (B sugar) from the molasses (B molasses). The B sugar is admixed with the A sugar and can be used as commercial sugar. The B molasses passes through 25 into the third crystallization stage 16c. In this stage, the sugar is again concentrated and crystallized but because of its high viscosity is passed into holding tank 26 through crystallizes. 27 and thereafter into centrifuge 28. Centrifuge 28 separates the sugar crystals (C sugar) from the molasses (C molasses). The C sugar is used as seed sugar to facilitate crystallization in stages 16a and 16b and the C molasses is recovered through 29 and is not economical to purify further.

The C molasses however contains up to 35% sugar and results in a large loss of sugar product from the extraction process.

Figure 2:
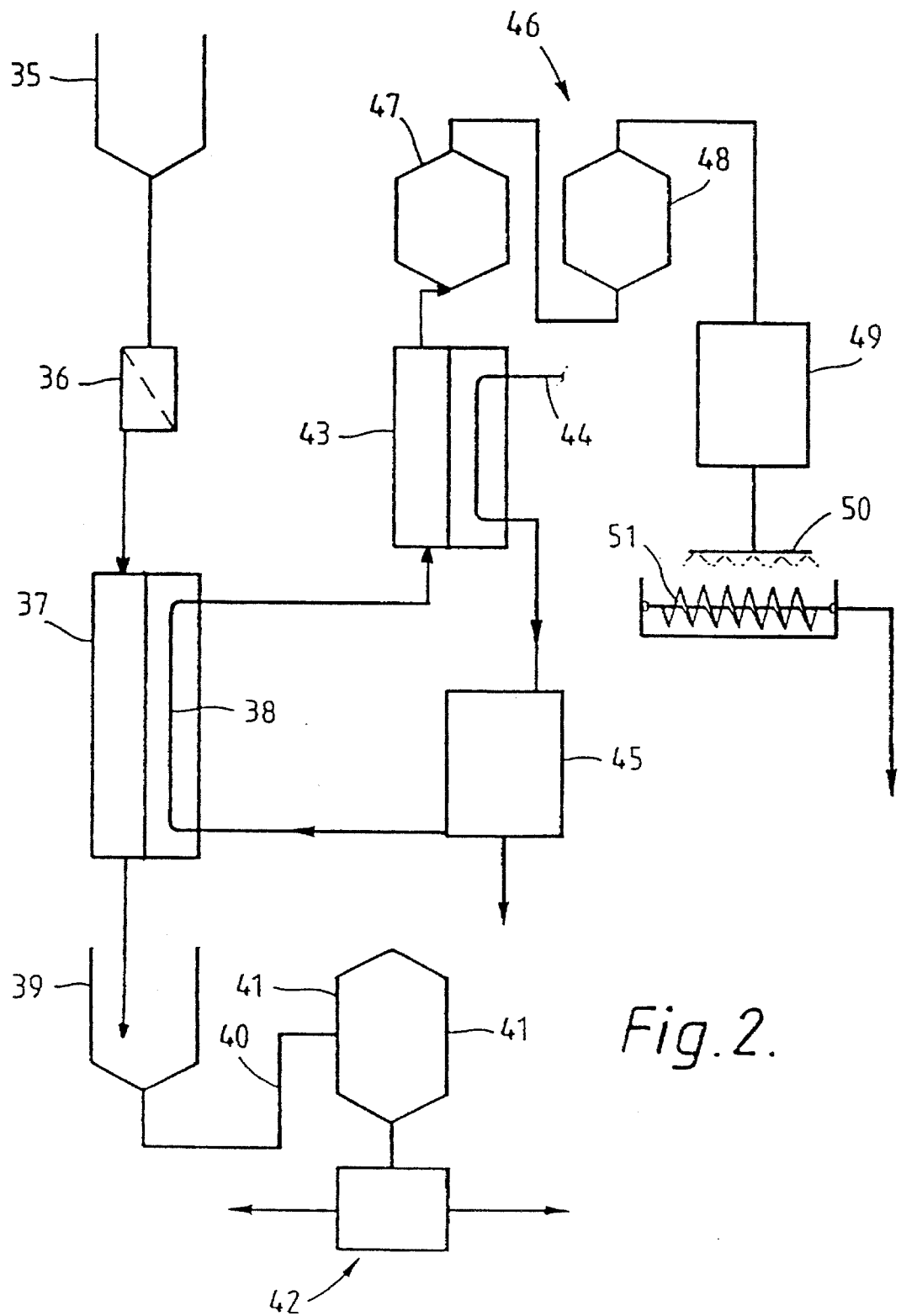
FIG. 2 is a flow diagram of the method according to a first embodiment of the invention.

FIG. 2 discloses a flow diagram of the method according to a first embodiment of the invention. The method is suitable to enable more sugar to be recovered in the third crystallization stage 16c as disclosed above with reference to FIG. 1 by removing the melassigenic ions from the B molasses prior to entry into the third crystallization stage.

In the first embodiment as illustrated in FIG. 2, the B molasses resulting from the non-crystallized portion of the second crystallization stage and having a solids content of about 70° brix passes from a holding tank 35 through a 50 micron screen 36 to remove any suspended solids. The term brix is used in the sugar industry to denote the total dissolved solids by weight in water by weight. Thus, molasses at 70° brix has 70 grams of solids dissolved in 30 grams of water. The molasses is pumped into a module 37 and contacts one side of a multiplicity of ultrafiltration membranes. The other side of the ultrafiltration membranes is contacted with a fluid in the form of a counter-current water flow 38.

Due to its pore size, monovalent ions such as potassium, sodium and chloride can pass quickly through the ultrafiltration membrane and some divalent ions and sugars, particularly invert sugars which have a low molecular weight, pass through the ultrafiltration membrane by a combined diffusive and convective transport effect. These materials are carried away by the counter-current water flow 38 on the other side of the membrane. Macromolecules are retained in the molasses due to their large size.

The faster diffusing monovalent potassium, sodium and chloride ions pass through the membrane faster than the slower diffusing sucrose and invert sugar. This increases the salts to sugar ratio and invert sugar to sugar ratio in the counter-current water flow 38. By varying the feed pressure of the molasses through the membrane, the ratio of convective and diffusive transport can be varied to suit.

The partially deionized B molasses is partially diluted and can be subsequently passed into the third crystallization stage 16c as illustrated in FIG. 1 (or shown diagrammatically as 41 in FIG. 2 with 42 representing the centrifuge). As the B molasses has been partially deionized, the third crystallization step now functions more effectively and results in a greater amount of crystallization of C sugar and the production of C molasses having less ash content.

If this stage of the process is taken to its limits, the B molasses would be highly demineralized and desugared and could then be considered final molasses and the low grade sugar recovery end of the sugar mill, C pans crystallizers and C centrifiges, would be redundant.

The counter-current water flow 38 containing dissolved ions and sugars is passed into a nanofiltration module 43 and contacts one side of a nanofiltration membrane at high pressure. The mobile monovalent sodium, potassium and chloride ions and some water pass through the nanofiltration membrane as permeate while the dissolved sugars are retained in the water. The nanofiltration permeate 44 passes into an evaporator 45 which evaporates off the water to separate the monovalent ions which can be recovered and used as fertilizers. The evaporated water can be condensed and can be re-used as the counter-current water flow 38.

The partially deionized and concentrated counter-current water flow 38 passes from the nanofiltration module 43 into an ion exchange resin module 46 comprising a cation exchange resin 47 and an anion exchange resin 48 which removes any remaining ions from the water. The resultant liquid, containing principally sugars, is evaporated in evaporator 49 to a syrup containing sucrose and invert sugars (glucose and fructose) and very little soluble salts.

The syrup can be "painted" or coated onto sugar obtained from the A sugar and/or B sugar obtained from crystallization stages 16a, 16b in FIG. 1 by spraying the syrup through sprayers 50 over the sugar as it passes along a sugar screw 51.

The coated raw sugar has a much higher quality than the standard production raw sugar as the painting syrup contains a low percentage of macromolecules and ash. The sugar will therefore have high filtrability, low starch, dextran, colour, ash and floc.

The production of raw sugar of this quality makes the use of juice incubators and the addition of amylase enzyme to juice redundant.

The partially demineralized B molasses may be further enhanced by the addition of dextranaze enzyme which due to the demineralized B molasses achieved by the method according to FIG. 2 is much more effective in breaking down long-chain organic non-sugars, as it is not supressed by the minerals.

The C molasses produced using the method as illustrated in FIG. 2 on the B molasses stream has a lower potassium content than normal C molasses and a lower content of organic non-sugars. This will make the molasses more suitable for fermentation as less inhibitors for the yeast are present.

Furthermore, in the fermentation industry, the still waste (or dundar) produced after fermentation and distillation will also have a lower potassium content and can be concentrated for sale as an animal feed ingredient as a concentrate syrup or spray-dried powder. The low ash content and especially the low potassium and chloride content make this product considerably less hygroscopic and provides a better animal feed as high potassium scours cattle and limits the amounts that can be fed to cattle.

The low potassium C molasses also provides better performance in the bakers' yeast manufacturing industry which uses molasses as its feedstock for yeast fermentation.

Figure 3:
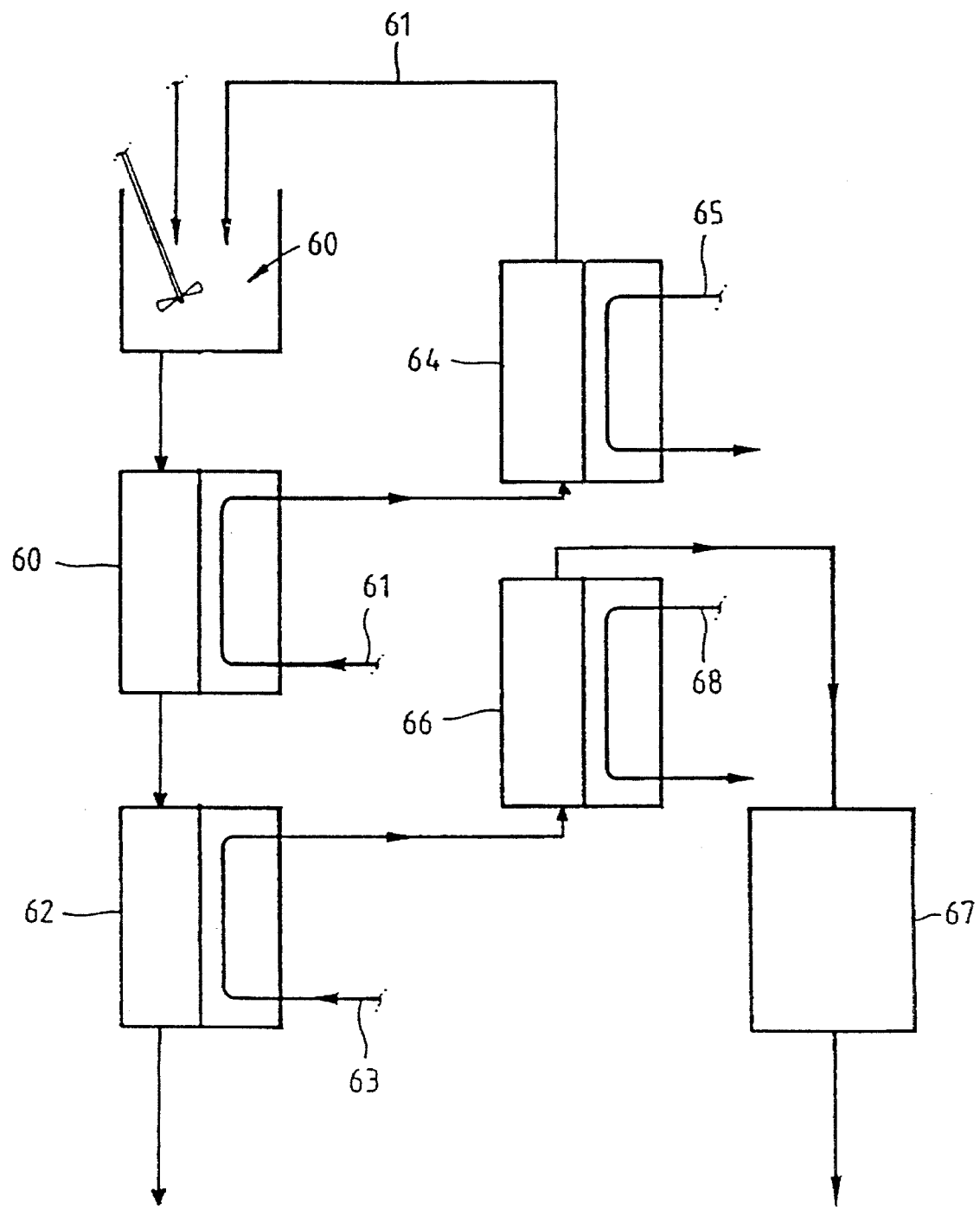
FIG. 3 is a flow diagram according to a second embodiment of the invention.

FIG. 3 illustrates the method according to a second embodiment of the invention.

In this method, the C molasses obtained from the third crystallization stage 16c as illustrated in FIG. 1 is treated. The C molasses typically has a solids content of approximately 80° brix and a viscosity of about 10,000 cps. The C molasses is added to holding tank 60 and is diluted to approximately 50° brix and a viscosity of between 5 and 10 cps by addition of recycled water 61 as more clearly described below.

The 50° brix molasses is passed into a first ultra-filtration module 60 and contacts one side of an ultra-filtration membrane. The other side of the ultra-filtration membrane is contacted with a counter-current water flow 61 which carries away any ions, and sugars which pass through the semipermeable membrane.

The partially deionized C molasses is passed into a second ultra-filtration module 62 where the molasses is again contacted with one side of an ultra-filtration membrane with the other side of the ultrafiltration membrane being contacted with a counter-current water flow 63.

Counter-current water flow 61 is passed into a nanofiltration module 64 where it contacts one side of a nanofiltration membrane. The permeate 65 passing through the nanofiltration membrane and comprising water and ions is evaporated and the ions recovered which can be used as a potash fertilizer.

The partially deionized water 61 passes from the nanofiltration module 64 and into holding tank 60 to dilute the incoming C molasses. Water 61 (containing dissolved sugars) has a viscosity of approximately 1 cps and a solids content of about 12° brix.

Water 63 passes through a second nanofiltration module 66 to remove ions therefrom and the demineralized nanofiltration retentate passes through an ion exchange resin 67 as illustrated in FIG. 3 and can be concentrated and used as a painting syrup, a syrup for brewing or a syrup for food additives or be recrystallized. The permeate 68 can pass to waste.

The molasses exiting from ultrafiltration module 62 is considerably lower in minerals and can be used as a value-added molasses product.

Figure 4:
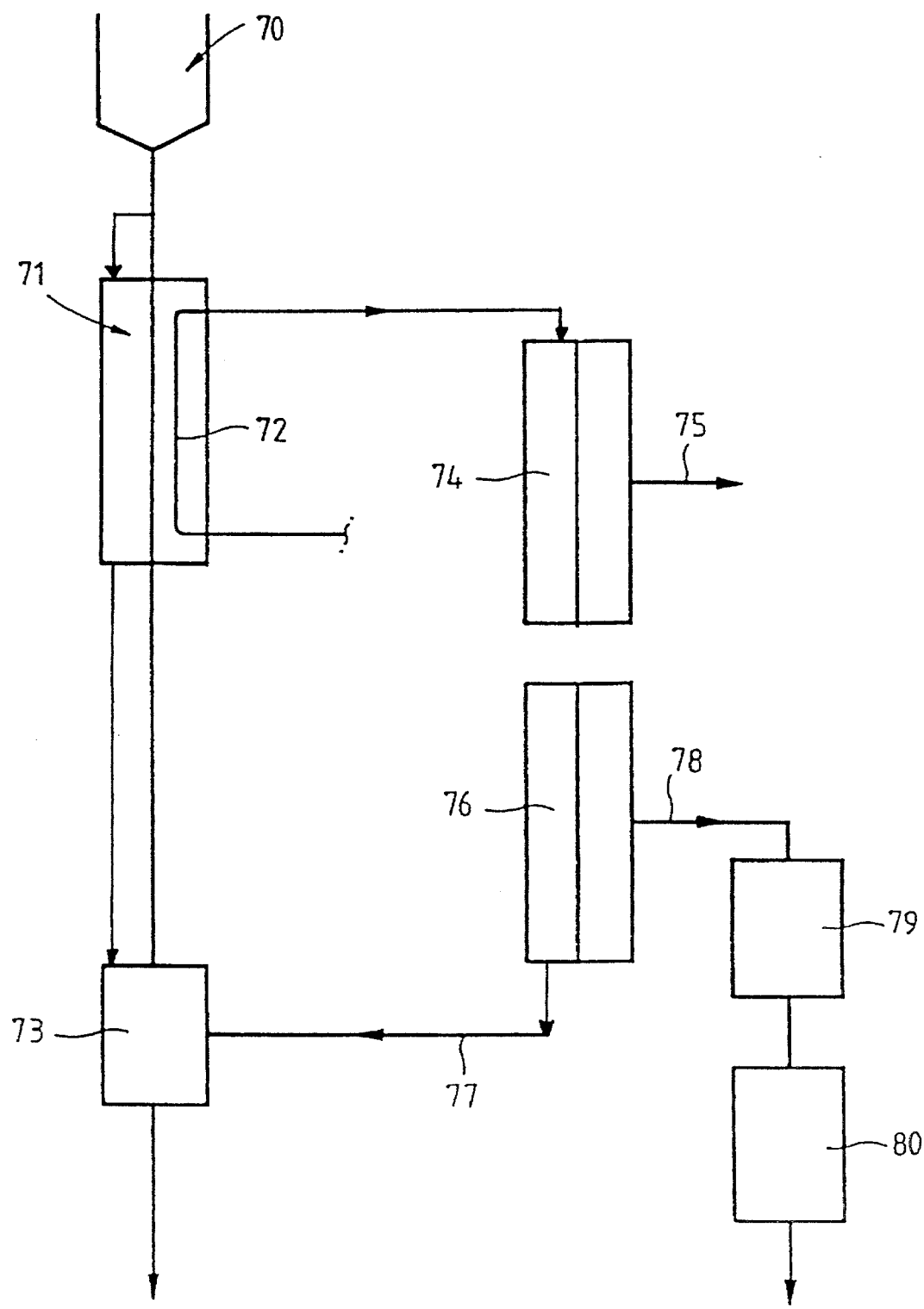
FIG. 4 is a flow diagram according to a third embodiment of the invention.

FIG. 4 discloses a flow diagram of the method according to a third embodiment of the invention. The method is suitable to enable more sugar to be recovered from beet molasses in the final stages of crystallization where high viscosity and impurities prevent further sugar recovery.

Beet molasses differs from cane molasses in that beet molasses has a higher sucrose content and very little invert sugar. The presence of raffinose is a characteristic of beet molasses. Organic non sugars are higher in beet molasses.

The beet molasses is diluted in a holding tank 70 to around 50° brix. Diluted molasses is pumped into the first membrane module 71 and contacts one side of a multiplicity of ultrafiltration membranes. The other side of the ultrafiltration membrane is contacted by a fluid 72 in the form of a counter current water flow.

Due to its pore size monovalent ions such as potassium, sodium and chloride can pass quickly through the membrane and also some divalent ions and sugars by a combined diffusive and convective effect. These materials are carried away by the counter current water flow 72 on the other side of the membrane.

Macro molecules are retained in the molasses. The faster diffusing monovalent potassium, sodium and chloride ions pass through the membrane faster than the slower diffusing sucrose. This increases the salts to sugars in the counter current water flow.

The partly deionised beet molasses can be subsequently passed to a third crystallization step 73 (see FIG. 1). This results in a sugar recovery and produces a molasses with a lower potash content.

Processing of beet molasses before the viscosity is high can result in the reduction of crystallizer capacity required to treat C massecuite.

The counter current water flow 72 containing dissolved ions and sugars is passed into a nonofiltration membrane 74 at high pressure. The mobile monovalent sodium, potassium and chloride ions and a large proportion of the water pass through the nanofiltration membrane as permeate 75 while dissolved sugars are retained in the water. The nanofiltration permeate 75 can be recovered as fertilizer if desired.

The partly deionised and concentrated counter current water flow passes from the nonofiltration module 74 to a third semipermeable membrane in the form of a high-pressure ultrafiltration module 76.

The high-pressure ultrafiltration membrane has a pore size intermediate between conventional ultrafiltration and nanofiltration.

The nanofiltration retentate containing sugars, reduced salts and middle sized molecules such as colour and raffinose contacts one side of the high pressure ultrafiltration membrane at high pressure. The more mobile salts and sucrose pass through the membrane while medium molecules such as colour and raffinose are retained in the water stream 77. This stream can be mixed with the product from the first membrane for low grade sugar recovery.

The high pressure ultrafiltration permeate 78 with sucrose and reduced colour and salts can be passed through columns of cationic and anionic ion exchange resins 79. The ion exchange resins can be selected to remove residual colour or salts or both. This highly filtered feed prevents the possibility of clogging the ion exchange bed. This membrane pretreatment reduces the load on the ion exchange column.

This high quality sugar solution can be used as a liquid sugar product or be crystallized in a vacuum pan 80 to produce high quality crystal sugar. The process can also be used as a pretreatment for ion exclusion plants. In this case the product after nanofiltration is used.

Another advantage of the method according to the invention is that the filtrability, starch, colour, dextran, grain elongation and floc properties of the sugar are greatly improved. The Minister's Standard for raw sugar quality for export requires various limitations on the above-mentioned properties and especially on the floc and penalties are imposed of the floc value is greater than the Minister's Standard.

The above properties are largely the result of layer of molasses film surrounding each high purity sugar crystal. The film provided by known sugar cane extraction techniques includes sucrose as well as reducing sugars, ash and macro-molecules.

In the method according to the invention, a molasses having a substantially lower amount of ash and macromolecules can be painted or coated onto the raw sugar to provide a higher purity molasses film. This in turn improves the properties and especially the floc property of the sugar resulting in a better quality sugar.

Thus, the method according to the invention provides an improved method for removing undesirable impurities from a sugar-containing solution and especially melassigenic ions which inhibit sugar crystallization. The method is particularly suitable to partially remove impurities from the B molasses stream prior to introduction into the third crystallization stage to improve the amount and quality of the C sugar which is recycled and the quality of C molasses.

The method is based upon the novel combination of two semi-permeable membranes having different pore sizes. The method can fractionate low grade sugar products into value added products. The method results in the production of three separate fractions from a low grade sugar product characterized by the first fraction having retained therein macromolercules, the second fraction being enriched with invert sugar and the third fraction (nanofiltration permeate) comprising the undesirable ash products.

All of the above fractions have considerable added value and even the third fraction can be evaporated and the solids used as fertilizer.

The first semi-permeable membrane will not allow the passage of macromolecules through the mebrane but will allow partial passage of sucrose, invert sugars and monovalent ions which pass into the aqueous stripping fluid. The second semi-permeable membrane separates the ash (monovalent ions) from the sucrose and invert sugars in the stripping fluid with high efficiency with the stripping fluid subsequent to contacting the second semi-permeable membrane being high in sugar content and low in ash content.

It should be appreciated that various other changes and modifications may be made to the embodiments described without departing from the spirit and scope of the invention as defined in the appended claims.

I claim:

1. A method for at least partially removing inorganic ions from a sugar containing solution containing such ions, the method including the steps of (a) contacting said solution with one side of a first semi-permeable membrane having a pore size between 80–1000 angstroms to allow fast diffusing inorganic ions and low molecular weight sugars to pass therethrough, (b) contacting the other side of said first semi-permeable membrane with a stripping fluid which at least partially dissolves the inorganic ions and sugars passing through said membrane, and (c) contacting the stripping fluid from step (b) with one side of a second semi-permeable membrane allowing passage of water and monovalent ions but resisting passage of the low molecular weight sugar molecules.

2. The method as claimed in claim 1, wherein said first semi-permeable membrane comprises an ultrafiltration membrane having a pore size of between 80–200 angstroms.

3. The method as claimed in claim 2, wherein said first semi-permeable membrane comprises between 40–80% available pore area and a thickness of between 30–100 microns.

4. The method as claimed in claim 1, wherein said stripping fluid contacting the other side of said first semi-permeable membrane comprises water or a water containing mixture.

5. The method as claimed in claim 1, wherein said second semi-permeable membrane comprises a nanofiltration membrane having a hypothetical pore size between 2–10 angstroms.

6. The method as claimed in claim 5, wherein the fluid retained by the nanofiltration membrane is further deionized by contacting the fluid with an ion exchange resin.

7. The method as claimed in claim 5, wherein the fluid retained by the nanofiltration membrane is returned to the sugar containing solution before the sugar containing solution contacts the first semi-permeable membrane.

8. The method as claimed in claim 5, wherein the fluid retained by the nanofiltration membrane contacts one side of a third semi-permeable membrane which allows passage of water, monovalent ions and low molecular weight sugars but resists passage of medium molecular weight sugars.

9. The method as claimed in claim 8, wherein said third semi-permeable membrane comprises a high pressure ultrafiltration membrane.

10. The method as claimed in claim 9, wherein permeate passing through the third semi-permeable membrane is contacted with an ion exchange resin.

11. An apparatus for at least partially removing inorganic ions from a sugar containing solution in said apparatus comprising a first semi-permeable membrane having a pore size between 80–1000 angstroms, means to contact said sugar containing solution against one side of said first semi-permeable membrane, means to contact an aqueous stripping fluid against the other side of said semi-permeable membrane, means to recover said partially deionized sugar containing solution from said first semi-permeable membrane, a nanofiltration membrane, an ion exchange resin, means to contact said stripping fluid against one side of said nanofiltration membrane subsequent to contacting said first semi-permeable membrane, and means to contact said stripping fluid with said ion exchange resin subsequent to contacting said nanofiltration membrane.

12. An apparatus for at least partially removing inorganic ions from a sugar containing solution in said apparatus comprising a first semi-permeable membrane having a pore size between 80–1000 angstroms, means to contact said sugar containing solution against one side of said first semi-permeable membrane, means to contact a stripping fluid against the other side of said semi-permeable membrane, means to recover said partially deionized sugar containing solution from said first semi-permeable membrane, a nanofiltration membrane, an ion exchange resin, means to contact said stripping fluid against one side of said nanofiltration membrane subsequent to contacting said first semi-permeable membrane, and a high pressure ultrafiltration membrane located downstream from said nanofiltration membrane such that fluid retained by said nanofiltration membrane contacts one side of the high pressure ultrafiltration membrane.

\* \* \* \* \*